Sept. 13, 1955    R. C. JAYE    2,717,848
PIPE COVERING
Filed July 17, 1953
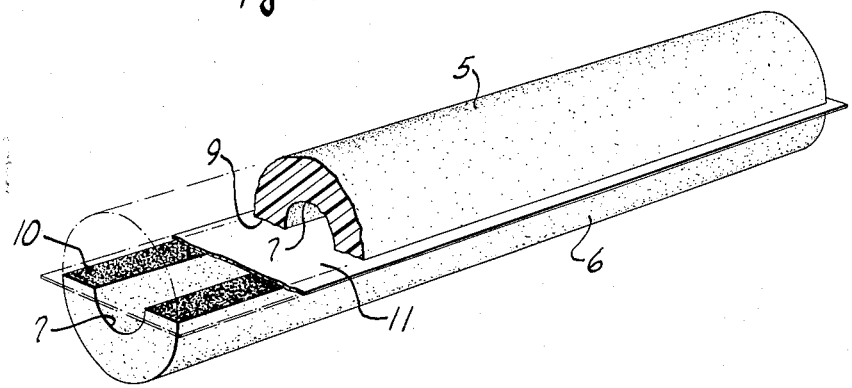
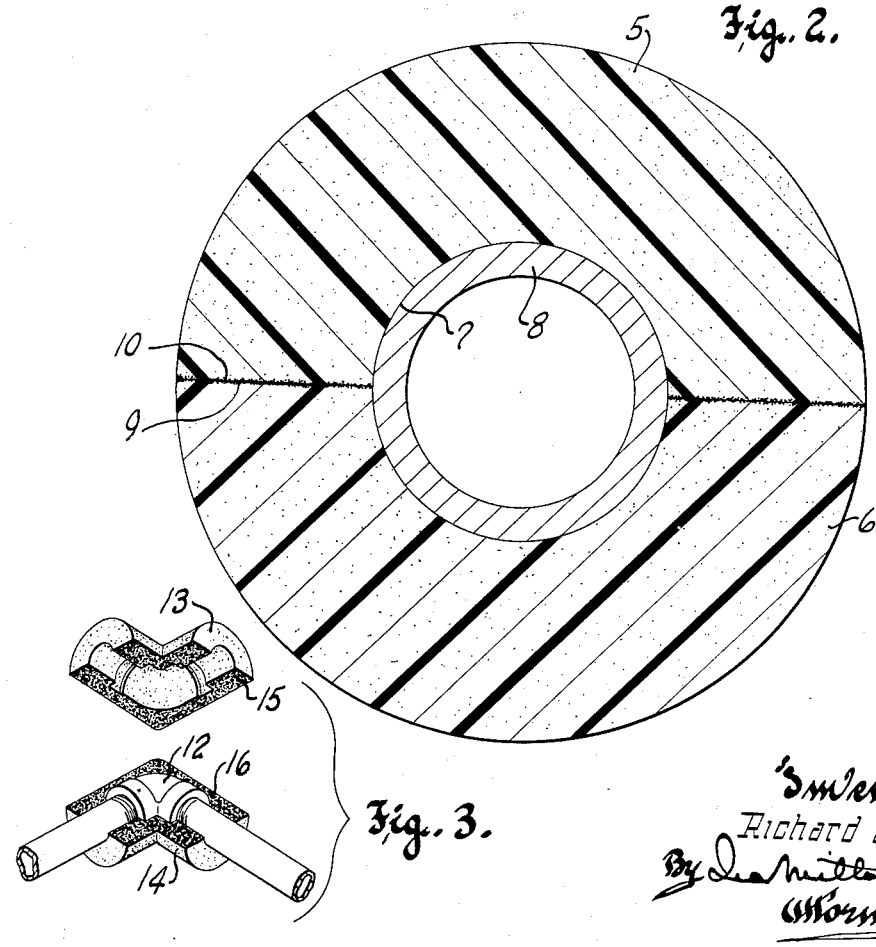
Inventor
Richard C. Jaye
By
Attorney

United States Patent Office 2,717,848
Patented Sept. 13, 1955

2,717,848

PIPE COVERING

Richard C. Jaye, Watertown, Wis., assignor to The Jaye Corporation, Watertown, Wis., a corporation of Wisconsin Application July 17, 1953, Serial No. 368,723

1 Claim. (Cl. 154—44)

This invention relates to pipe covering of the type designed to provide thermal insulation for pipes carrying either hot or cold fluids as for instance steam and hot water pipes and cold water pipes. In the latter case the insulating covering is generally used to prevent the dripping of condensate which accumulates on the pipes during warm weather.

The purpose of this invention is to provide a pipe covering which may be easily applied to pipes already in place, and which requires no particular skill in the application thereof.

It has been found that the cellular plastic material of the type sold under the trade-name "Styrofoam" is an excellent thermal insulation, and being light and self-sustaining possesses all of the qualities of a good pipe covering material. It is, therefore, more specifically an object of this invention to provide a pipe covering made of cellular plastic material.

A further object of this invention resides in the provision of novel means for securing complementary sections of such material to one another to provide a complete enwrapment for the pipe and its fittings.

With the above and other objects in view, which will appear as the description proceeds, this invention resides in the novel construction, combination and arrangement of parts substantialy as hereinafter described and more particularly defined by the appended claim, it being understood that such changes in the precise embodiment of the herein disclosed invention may be made as come within the scope of the claim.

The accompanying drawing illustrates one complete example of the physical embodiment of the invention constructed according to the best mode so far devised for the practical application of the principles thereof, and in which:

Figure 1 is a perspective view of a length of pipe covering embodying this invention, parts thereof being broken away and shown in section;

Figure 2 is an enlarged cross sectional view through the pipe covering illustrating the same applied to a pipe; and Figure 3 is a perspective view at a reduced scale illustrating the manner in which the pipe covering of this invention is applied to pipe fittings.

Referring now particularly to the accompanying drawing, the numerals 5 and 6 designate two longitudinally extending pipe covering sections which together provide a complete enwrapment for the pipe and thus when assembled form a tubular structure having a bore 7 of a size to receive the pipe 8 to which the covering is to be applied. The sections 5 and 6 are arcuate in cross section and identical in size and shape, and in the embodiment of the invention illustrated two such sections comprise a complete covering unit, though it should be understood that the number of sections comprising the unit could be increased, if desired.

In any event the complementary sections are cut from solid logs or blocks of cellular plastic material of the type sold under the trade-name "Styrofoam."

With the two sections 5 and 6 identical, the shaping thereof is simplified and easily done on an apparatus such as that disclosed and claimed in the copending application of Richard C. Jaye, Serial No. 337,967, filed February 20, 1953, now Patent No. 2,677,747. With such an apparatus blocks or logs of Styrofoam are advanced through a hot wire cutting station at which a hot wire "cuts" the block or log into bars or strips having a uniform cross section of a shape determined by the wire. These bars or strips are then cut into easily handled lengths to provide the complementary sections 5 and 6.

The sections 5 and 6 have mating surfaces 9 and 10 which are preferably flat and radial to the bore 7. These surfaces are coated with a suitable cohesive material such as latex so that upon being brought into engagement they adhere to one another but will not adhere to surfaces not so coated. To enable the covering to be handled and distributed as a complete unit, a sheet of wax paper 11 or any other suitable membrane is interposed between the surfaces 9 and 10 to be removed when the covering is to be applied.

The application of the covering sections to the pipe obviously is extremely simple and merely requires placing the sections on the pipe and pressing their surfaces 9 and 10 into engagement.

Though it is perhaps clear from the foregoing description that pipe fittings such as the elbow 12 shown in Figure 3 may be covered in the same manner as described, it will be appreciated that the covering for the fittings preferably comprises two similar sections 13 and 14 which mate on the plane of symmetry of the fitting. The shaping of these sections may be done in any suitable manner, and as in the case of the sections 5 and 6, the mating faces 15 and 16 are coated with a suitable cohesive.

From the foregoing description taken in connection with the accompanying drawing, it will be readily apparent that this invention provides a pipe covering of great utility and that it materially simplifies the insulation of pipes and enables the average home owner to do this himself.

What I claim as my invention is:

As an article of manufacture: a pipe covering comprising substantially identical sections of cellular plastic material which together form the hollow structure shaped to snugly embrace the pipe to be covered, said sections having mating surfaces; cohesive coatings on said surfaces adapted upon being brought into engagement to secure the sections one to the other; and a layer of protective sheet material interposed between said coated surfaces to prevent cohesion therebetween and adapted to be removed so as to expose said cohesive coatings for engagement of one with the other.

References Cited in the file of this patent

UNITED STATES PATENTS

| | | |
|---|---|---|
| 620,476 | Michell | Feb. 28, 1899 |
| 1,440,978 | Feigan | Jan. 2, 1923 |
| 1,990,701 | Knight | Feb. 12, 1935 |
| 2,023,204 | Munters et al. | Dec. 3, 1935 |
| 2,602,764 | Billingham | July 8, 1952 |
| 2,635,363 | Dorgin | Apr. 21, 1953 |